United States Patent [19]

Hata et al.

[11] Patent Number: 4,796,513

[45] Date of Patent: Jan. 10, 1989

[54] SPRING BRAKE CYLINDER

[75] Inventors: Yasuhisa Hata, Akashi; Osamu Akamatsu, Kobe, both of Japan

[73] Assignee: Nippon Air Brake Co., Ltd., Kobe, Japan

[21] Appl. No.: 32,103

[22] Filed: Mar. 27, 1987

[30] Foreign Application Priority Data

Mar. 28, 1986 [JP] Japan .................................. 61-46433

[51] Int. Cl.[4] ............................................ F01B 25/26
[52] U.S. Cl. ............................. 92/5 R; 92/5 L; 92/21 MR; 92/129; 92/130 A; 92/63
[58] Field of Search ............... 92/5 R, 5 L, 21 MR, 92/129, 130 A, 92, 63

[56] References Cited

U.S. PATENT DOCUMENTS

| | | | |
|---|---|---|---|
| 2,813,518 | 11/1957 | Driskel et al. | 92/21 MR |
| 3,182,566 | 5/1965 | Berg et al. | 92/130 A |
| 3,498,188 | 3/1970 | Rodriguez | 92/29 |
| 3,880,054 | 4/1975 | Domyan | 92/129 |
| 3,994,206 | 11/1976 | Dahlkvist et al. | 92/29 |
| 4,080,876 | 3/1978 | Sturgess | 92/130 A |
| 4,230,021 | 10/1980 | Aurousseau et al. | 92/29 |
| 4,491,059 | 1/1985 | Martin | 92/5 L |

FOREIGN PATENT DOCUMENTS

| | | | |
|---|---|---|---|
| 1625548 | 10/1967 | Fed. Rep. of Germany | 92/29 |
| 2365966 | 10/1977 | Fed. Rep. of Germany | 92/29 |
| 288929 | 1/1950 | Switzerland | 92/5 R |

*Primary Examiner*—Robert E. Garrett
*Assistant Examiner*—Thomas Denion
*Attorney, Agent, or Firm*—J. O. Ray, Jr.

[57] ABSTRACT

A sensing means is provided to indicate an operating condition of a spring brake cylinder assembly in which such operating condition may be one of a brake applied and a brake release position. The sensing means engages a clutch control mechanism which includes means to engage the sensing means at different locations to make a determination of such operating condition.

5 Claims, 6 Drawing Sheets

SPRING BRAKE CYLINDER

SCOPE OF INVENTION REGISTRATION REQUEST (1) This contrivance relates to a spring brake cylinder, as disclosed in our Japanese patent application No. U61-46433, which is incorporated herein by reference thereto, which consists of the following parts. A cylinder body, a piston housed in the cylinder body, a spring for spring braking which pushes back the piston to its normal position, a pushrod for braking which extends from the piston coaxially to come out of one of the ends of the cylinder body, and a clutch which intermediates between the piston and the pushrod, making connections and disconnections of their relative displacements along the axis.

The present design offers the following features. The clutch is a ball clutch with a cylinder-shaped control part built coaxially with the piston. The central part can be moved together with the piston along the axis and can also be rotated against the piston, making connections and disconnections between the pushrod and the piston by controlling the positions of balls with its rotational motions. An electric switch is installed so that the position of the piston, when the spring brake is activated, can be differentiated from that when the spring brake is released either by the air pressure or the disengaged clutch. A concave or a convex is made on the outer surface of the control part to operate the electric switch which is positioned at an appropriate place in the cylinder body, always facing the outer surface of the control part while the part moves along the axis following the movements of the piston.

DETAILED DESCRIPTION OF THE CONTRIVANCE

Industrial Applications

This contrivance relates to the spring brake cylinder with quick release mechanism, especially the one which has an electronic device to detect the condition of the cylinder.

Conventional Technology

Figure 7:
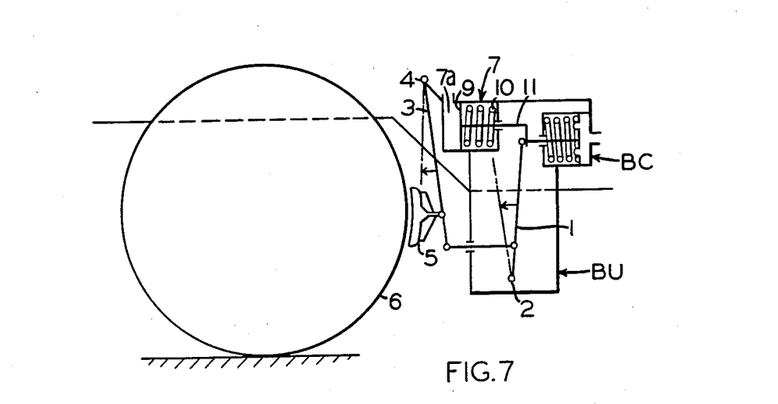
FIG. 7 Schematic side view showing typical application of a spring brake cylinder. Part of a car and a brake unit is shown.
Figure 8:
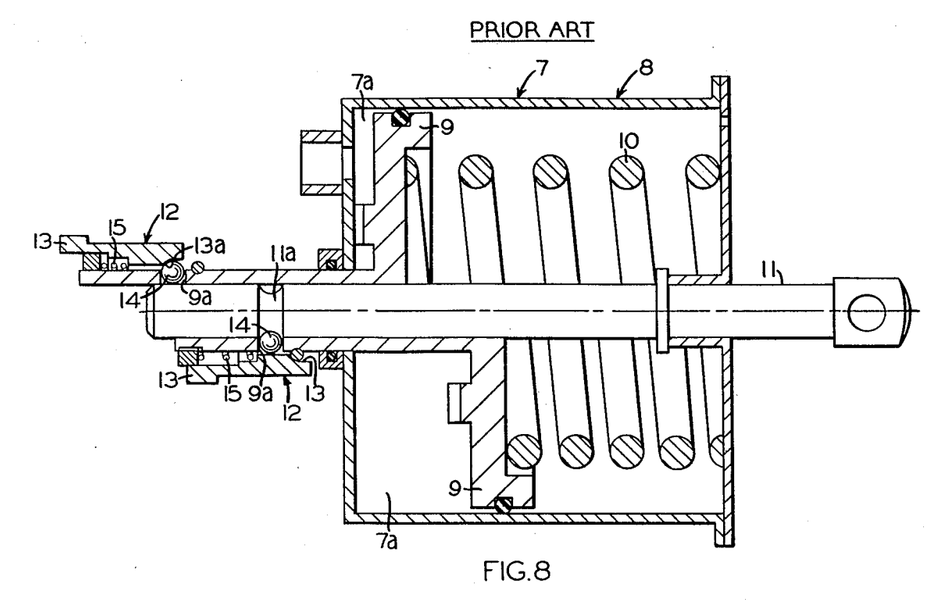
FIG. 8 Vertical cross sectional side view of a typical conventional brake cylinder. Top half and bottom half correspond to different states.

A typical design of conventional spring brake cylinders is shown in FIG. 8. They are employed as a part of a brake unit BU as shown in FIG. 7 or connected to a basic brake device with brake levers. As shown in FIG. 7, normal brake operation is activated as follows. Compressed air is supplied to the brake cylinder BC from air brake control device not shown in the figure. As a result, the piston rod is pushed out to let the lever 1 swing to the position indicated by a single dotted broken line with its bottom end as a pivot 2. The suspending rod 3, being connected to the lever, swings as shown by a single dotted broken line with its top end as a pivot 4. The brake shoe 5 held by the suspending rod 3 will be pressed against the rim of the wheel 6 causing braking. When the compressed air in the brake cylinder BC is evacuated, the lever 1 and the suspending rod 3 are in the positions shown by solid lines in the figure and the brake is released.

The spring brake cylinder 7 is a separate unit from the brake cylinder BC for normal brake operations just described. In FIG. 8, 8 shows the cylinder body, 9 the piston, 10 the spring for spring braking, 11 the pushrod, 12 the clutch, and 13 is the clutch control part. This spring brake cylinder 7 has its pushrod 11 connected to the lever 1 as shown in FIG. 7. When the pushrod 11 moves to the left from the position shown in the figure, the condition of being connected to lever 1 causes the lever 1 to swing. The lever 1 alone can swing to the left freely, however. Therefore, normal braking operation with the brake cylinder BC is made with the pushrod 11 moved to the rightmost position as shown in the figure. The spring brake cylinder 7 is not involved in the operation. The state, where the pushrod 11 is in the rightmost position, as illustrated in FIG. 7 is realized by compressed air in the cylinder room 7a of the spring brake cylinder 7. Here, the piston 9 is pushed to the right against the spring 10 and the clutch 12 is engaged to connect the piston 9 and the pushrod 11. This corresponds to the state shown as a bottom half section of FIG. 8.

As mentioned above, the spring brake cylinder 7 is used, for example, to keep the brake on while a railroad car is parked. Its normal position is shown as a bottom half section of FIG. 8. When the compressed air is evacuated from the cylinder room 7a, the spring 10 will let the right end of the pushrod 11 pull the top of the lever 1 to the left. This causes the lever 1 to swing and the brake will be applied in just the same way as the brake cylinder BC is activated.

The clutch 12 serves to release the brake without using compressed air when the spring brake cylinder 7 is in action. As shown in FIG. 8, it intermediates between the piston 9 and the pushrod 11 and consists of a channel 11a in the pushrod 11, several balls 14 which relate to the channel 11a, an operation part 13, a spring 15 and others. The balls 14 are held in the drilled hole 9a in the cylinder-shaped part of the piston 9. The clutch 12 is shown in the engaged state in the bottom half of FIG. 8 and in the disengaged state in the top half of the figure. The clutch 12 is disengaged from the engaged position by moving the operation part 13 along the axis against the action of the spring 15. Because the larger inner diameter portion 13a of the part comes to the position of the balls 14, the clutch 12 is disengaged. In this state, the pushrod 11 does not move to the left even if the piston 9 is in the leftmost position. Therefore, the spring brake cylinder 7 does not cause braking.

The spring brake cylinder 7 which is equipped with a clutch 12 as shown in FIG. 8 is described in the detailed description of U.S. Pat. No. 3,498,188. Improved versions also exist as U.S. Pat. Nos. 4,080,875 and 4,480,531.

Figure 9:
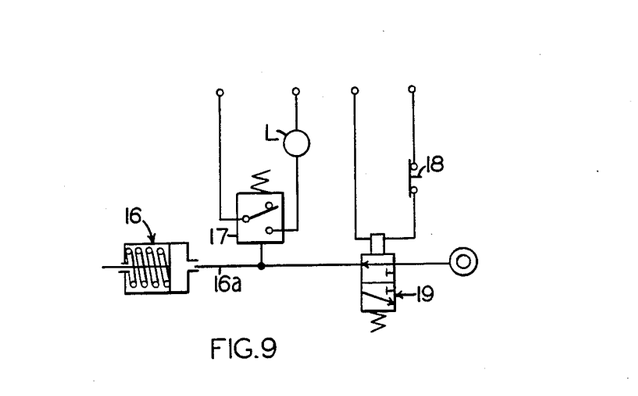
FIG. 9 Schematic circuit diagram of a typical conventional detection device for the operation status of a spring brake cylinder.

Spring brake cylinders with a clutch described above have been in use recently. For those without a clutch, a pressure switch in the air supply tubing to the spring brake cylinder has been sometimes used to let the operator know if the spring brake is in action or not by detecting the compressed air pressure. The schematics are shown in FIG. 9. When compressed air is supplied to the spring brake cylinder 16 as shown in the figure, the pressure switch 17 is open and the parking brake lamp L is off. When the parking brake switch 18 is open and the solenoid valve 19 is switched to the evacuation state, the spring brake cylinder 16 will be evacuated causing the pressure switch 17 to be closed. The parking brake lamp L is now on. In the figure, 16a indicates air supply tubing.

For the same purpose, it is possible to use a mechanism to detect the position of the piston with a stroke switch as described in the official report invention 60-4904.

Problems this Contrivance Intends to Solve

The detection method shown in FIG. 9, when applied to the spring brake cylinder with quick release mechanism, can not identify brake release by clutch disengagement.

In the case of the stroke switch, one switch detects if the piston is at a certain position or not. Therefore, one needs to use either the detection mechanism shown in FIG. 9 together with one stroke switch or two stroke switches. In either case, the design becomes complex.

The purpose of this contrivance is to build a simple yet accurate and reliable detector of the status of the operation for a spring brake cylinder with quick release mechanism.

Methods to Solve the Problem

Method in this contrivance relate to a spring brake cylinder which consists of the following parts. A cylinder body, a piston housed in the cylinder body, a spring for spring braking which pushes back the piston to its normal position, a pushrod for braking, which extends from the piston coaxially to come out of one of the ends of the cylinder body and a clutch which intermediates between the pushrod and the piston makes connections and disconnections of these parts in their relative motions along the axis. Here, the clutch is a ball clutch with a cylinder-shaped control part built coaxially with the piston. The control part can be moved together with the piston along the axis and can also be rotated against the piston, making connections and disconnections between the pushrod and the piston by controlling the positions of balls with its rotational motions. The contrived methods have the following features. An electric switch is installed so that the position of the piston, when the spring brake is activated, can be differentiated from that when the spring brake is released whether by air pressure or the disengaged clutch. A concave or a convex is made on the outer surface of the control part to operate the electric switch which is positioned at an appropriate place in the cylinder body, always facing the outer surface of the control part while the part moves along the axis following the movements of the piston.

Theory of Operation

In the method described above, the control part which is one of the components of the clutch is built to move together with the piston in the axis direction. The position of the piston can be detected by actuating the electric switch with a concave or a convex made on the outer surface of the control part. The positions of the piston are different when the spring brake is activated, or when the spring brake is released by the air pressure, or when the spring brake is released by disengaging the clutch. Making a concave or a convex corresponding to each piston position in different brake operation and released states, it is possible to get a signal from the electric switch to identify the operation status of the spring brake cylinder in an accurate and reliable way.

Examples of Installation

Figure 1:
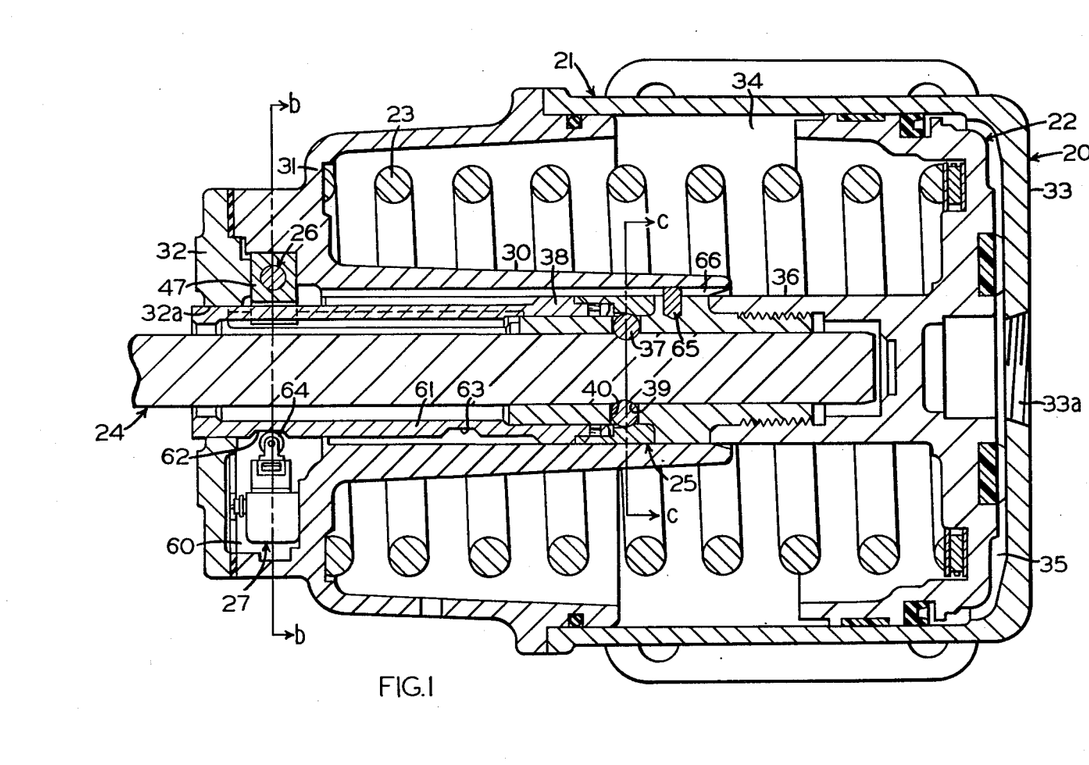
FIG. 1 Vertical cross sectional side view of the first example of the installation of the contrivance.
Figure 2:
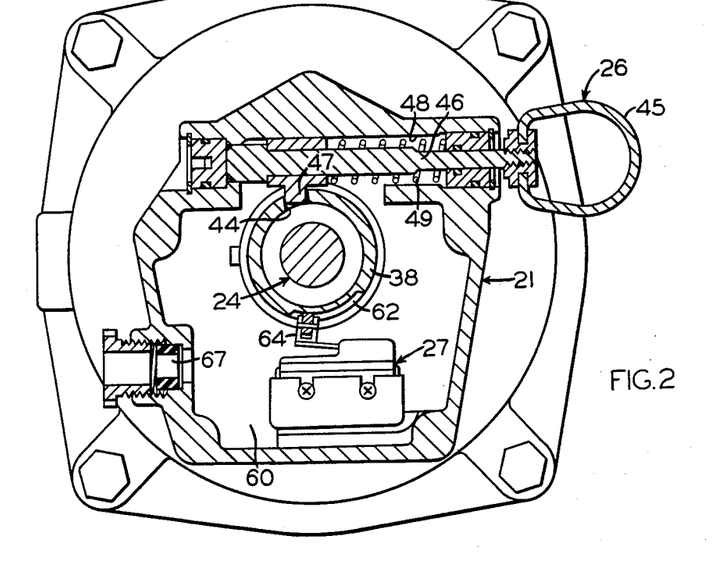
FIG. 2 b—b cross section in FIG. 1.
Figure 3:
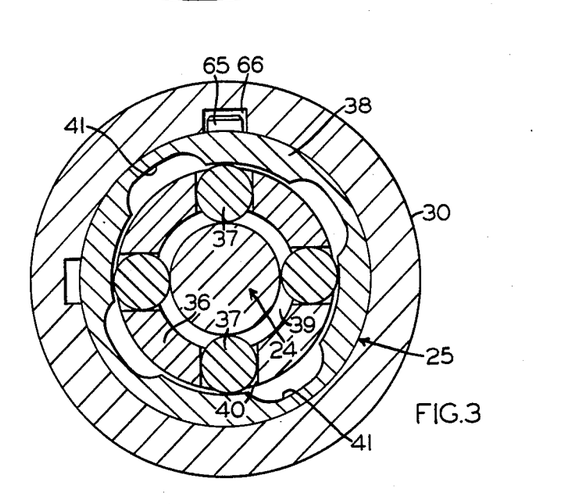
FIG. 3 Enlarged c—c cross section in FIG. 1.

The first example of the installation is shown in FIGS. 1 through 3. In the figures, 20 indicates the entire unit of the spring brake cylinder, 21 the cylinder body, 22 the piston, 23 the spring for braking, 24 the pushrod, 25 the clutch, 26 an operation part and 27 is a microswitch.

In the cylinder body 21, a coaxial cylindrical part 30 extends from the endwall 21. A hole 32a is made on an end part 32 and extends to the inner wall of the cylindrical part 30. An in/outlet for compressed air 33a is in the other endwall 33.

The piston 22 moves inside the cylinder body 21 between the end of the cylindrical part 30 and the endwall 33, dividing the cylinder body 21 into a spring room 34 and a compressed air room 35. The piston 22 has a cylinder-shaped part 36, which extends from its center to the spring room side coaxially with the cylinder body 21. This part fits into the cylindrical part 30, while being allowed to make translational motions along the axis.

The spring 23 for spring braking is housed in the spring room 34 of the cylinder body between the endwall 31 and the piston 22, pushing the piston 22 to the side of the compressed air room 35.

When the clutch is engaged, the one end of the pushrod 24 is positioned inside the cylinder-shaped part 36 of the piston 22 and the other end extends out of the cylinder body 21, being connected to the lever 1 as shown in FIG. 7.

The clutch 25 makes connections and disconnections of the movements of the piston 22 and the pushrod 24 along the axis. It consists of four balls 37 which are held in the cylinder-shaped part 36 of the piston 22, a control part 38 which controls the positions of the balls 37, and concaves 39 which are made in the pushrod 24 and relate to the balls 37. The four balls 37 are held in holes 40, which are drilled with equal distances on the circumference of the end of the cylinder-shaped part 36, with the motions in the radial directions being allowed. The control part 38 is cylinder-shaped and its one end fits to the outside of the cylinder-shaped part 36 where the balls are held. The other end reaches the end of the cylinder through the cylindrical part 30 of the cylinder body 21. It is held in the hole 32a of the end part 32. With its rotational as well as translational motions along the axis being allowed, it can be rotated in relation to the piston 22. As shown in FIG. 3, concaves 41 are made on the inner wall of the control part 38 so that they will accept the outward motions of the balls 37 when the control part is rotated to match the positions of the concaves 39 and the balls 37. The concave in the pushrod 24 is a ring-shaped channel and relates to the balls as shown in FIG. 3. A channel 44 is cut in the control part 38. It has a length corresponding to the stroke of the piston to keep the operation part 26 connected at the cylinder end. In addition to this, a convex 61 and concaves 62 and 63 are made in the control part 38 to operate a microswitch 27.

As shown in FIG. 2, the operation part 26 consists of a handle 45, a handle axis 46, and a catch 47. It is housed inside a housing 48 together with a spring 49. The housing 48 is built between the end wall 31 and the lid 32 of the cylinder body 21, allowing translational motions of the operation part 26 along the cross section perpendicular to the axis of the cylinder body 21. The handle 45 is positioned at the external side of the cylinder body 21. The catch 47 is locked in the channel 44 in the control part 38 and the whole unit is held at the leftmost position under the action of the spring 49. In this state, as shown in FIG. 3, the control part 38 locks the balls 37 in the concave 39 in the pushrod 24 with its small diameter part apart from the concaves 41 pressing the balls 37. By pulling the handle 45 from the cylinder body 21 in this state, the catch 47 rotates the control part 38 by a certain angle to position the concaves 41 outside the balls 37. The clutch 25 engaged is thus disengaged.

The microswitch 27 is contained in a housing 60 which is built between the endwall 31 and the lid 32 of the cylinder body 21. Its actuator 64 faces the outside of the control part 38. The concave 62 is made at the position of the actuator 64 when the piston 22 is moved to the rightmost position in the cylinder body 21 in FIG. 1. The concave 63 is made where the actuator 64 faces when the piston 22 is moved to the left under the action of the air pressure in the compressed air room 35 against the spring 23. The convex 61 is a remaining portion between the concaves 62 and 63. As shown in FIG. 2, the concaves 62 and 63 are made with enough width along the circumference so that they will work as concaves against the actuator 64, while the control part 38 rotates. The position of the concave 62 corresponds to the position of the piston 22 when the spring brake is released by disengaging the clutch 25. The position of the concave 63 corresponds to the position of the piston 22 when the spring brake is released by the action of the air pressure. The convex 61 corresponds to the position of the piston 22 when the spring brake is on. By using a microswitch 27 which closes when the actuator 64 faces the concave 62 or 63 and opens when it faces the convex 61, one can obtain signals to tell if the spring brake is in action or not.

In FIGS. 1 and 3, 65 is a pin and 66 is a channel. These are to prevent the piston 22 from rotating. 67 in FIG. 2 is a hole for electrical leads.

This brake cylinder 20 is used in the same way as explained with FIG. 7. Normally, compressed air is supplied to the compressed air room 35 through the compressed air in/outlet 33a of the cylinder body 21. Since the clutch 25 is engaged, the piston 22 is moved to the left from the position shown in FIG. 1 against the action of the spring 23. Here, the microswitch 27 is closed, facing the concave 63, detecting the released spring brake condition.

To activate the spring brake, the compressed air in the compressed air room 35 is evacuated while the clutch 25 remains engaged. As a result, the piston 22 begins to move to the position shown in FIG. 1, but stops when the brake shoe 5 is pressed against the wheel 6. In this state of spring braking, the pushrod 24 is pulled into the cylinder body 21 causing the lever 1 and the suspending rod 3 to swing as shown in single dotted broken lines in FIG. 8. The microswitch 27 is open, facing the convex 61, detecting the spring braking condition.

The spring brake is released by pulling out the handle 45 from the side of the cylinder. Since the clutch 25 is thus disengaged, the piston 22 reaches the position shown in FIG. 1 under the action of the spring 23. The lever 1 returns to the released position by the spring in the brake cylinder BC. The pushrod 24 follows this motion. Because the concave 39 in the pushrod 24 moves away from the balls 37 due to the relative displacement of the pushrod 24 to the piston 22, the operation part 26 remains roughly at the same position when the handle 45 is released. The microswitch 27 is closed facing the concave 62, detecting the released spring brake condition.

When compressed air is supplied to the compressed air room 35 in this released spring brake condition, the piston 22 moves to the left in FIG. 1. When the balls 37 meet the concave 39, the operation part 26 moves under the action of the spring 49 to rotate the control part 38. The clutch 25 becomes thus engaged.

Figure 4:
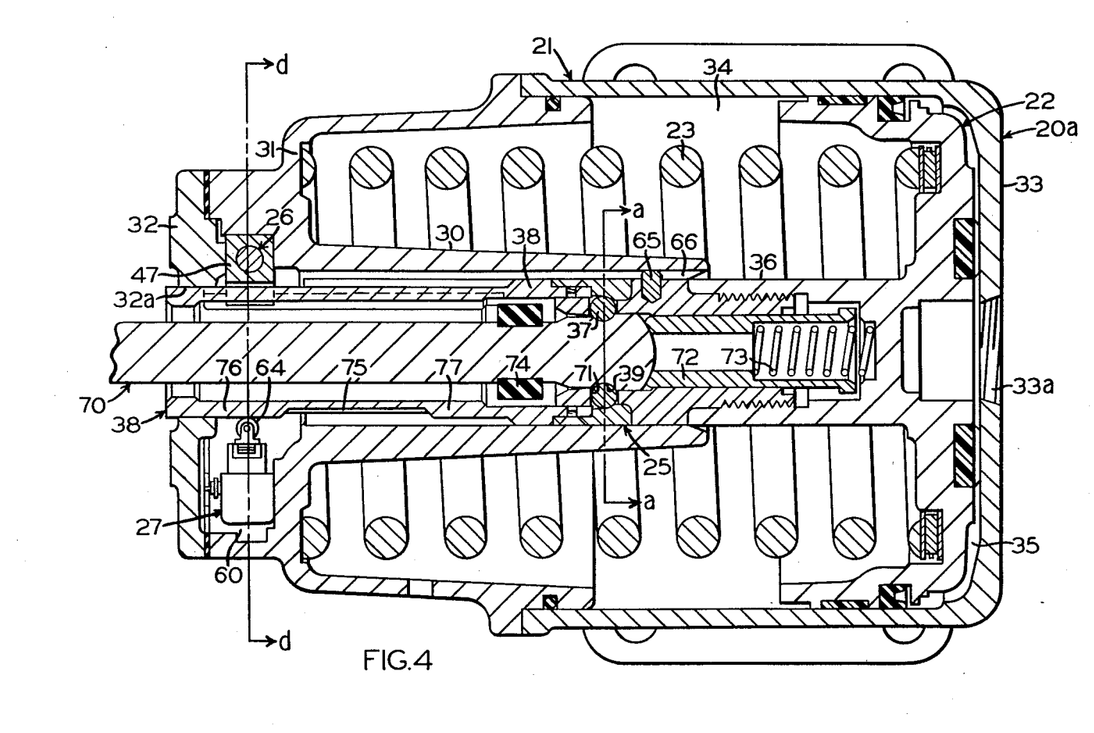
FIG. 4 Horizontal cross sectional top view of the second example of the installation.
Figure 5:
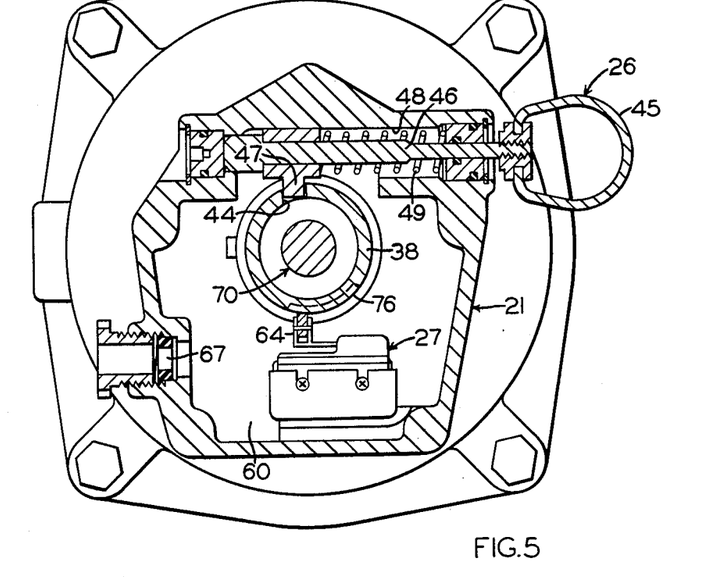
FIG. 5 d—d cross section in FIG. 4.
Figure 6:
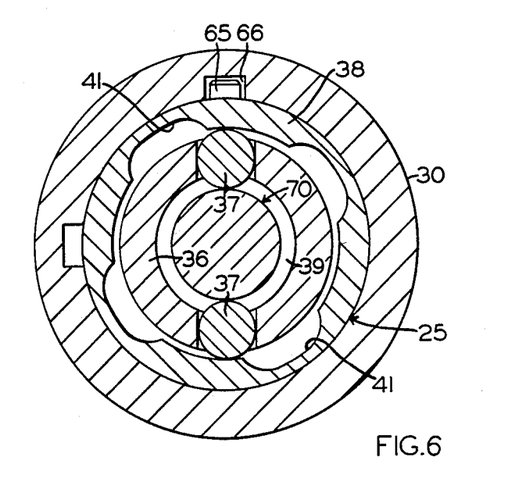
FIG. 6 Enlarged e—e cross section in FIG. 4.

The second example of the installation is shown in FIGS. 4 through 6. This installation differs from the first example in the following ways. The pushrod 70 can be swayed at the connecting side to the lever 1 with its clutch side as a pivot when the clutch is engaged. Also the formation of the concave and the convex on the surface of the control part 38 against the microswitch 27 is reversed. These differences will be explained below. The same numbers are given to the parts equivalent to the ones in FIGS. 1 through 3.

The pushrod 70 has a concave 39 which locks the balls 37 in the cylinder body 21. The number of the balls 37 in the clutch 25 is reduced to two. They are held in the holes 71 in the cylinder-shaped part 36. The holes are drilled at the end along the horizontal diameter allowing the motions of the balls along this diameter. In this construction, the end of the pushrod 70 extending from the cylinder 21 can be swayed vertically with the line connecting the balls 37 as a pivot when the clutch is engaged. As shown in FIG. 7 this design allows the vertical motions of the connecting end of the pushrod 70, when it moves on a circle following the swing motion of the lever 1 to which it is connected directly by a pin. Therefore this design simplifies the connection mechanism to the lever 1. In FIG. 4, 72 is the second piston and contained in the cylinder-shaped part 36 together with a spring 73. It can move to the end of the cylinder-shaped part 36 reaching the part where the balls 37 are held. This is to prevent the balls 37 from dropping. 74 is a ring made of rubber-like elastic material to hold the clutch-end of the pushrod 70 roughly coaxially with the cylinder part 3 when the clutch is disengaged. Engaging the clutch is thus made easier.

The formation of concaves and convexes on the surface of the control part 38 facing the microswitch 27 is made as follows. The convex 61 in FIG. 1 corresponds to the concave 75, the concave 62 to the convex 76 and the convex 63 to the concave 77.

This second example of the installation of the spring brake cylinder 20a is used and functions in a similar way as the first example. When the clutch 25 is disengaged, the pushrod 70 comes out of the cylindrical part 36. The second piston 72 is pushed out to prevent the balls 37 from dropping. The clutch 25 will also be engaged automatically when compressed air is supplied to the compressed air room 35. The detection of the active or released state of the spring brake is made similarly by the microswitch 27.

The Effect of the Contrivance

The spring brake cylinder in this contrivance is equipped with a quick release mechanism which employs a ball clutch with rotational control to disconnect a pushrod and a piston. The control part of the clutch moves together with the piston. The condition of the brake action is identified with the position of the piston which is detected by a microswitch and other electric switches which are housed in the cylinder body and face the concave and convex formation on the outer surface of the control part. It is thus made possible to identify the operation status of the brake cylinder with quick release mechanism with a very simple design.

20, 20a—spring brake cylinder, 21—cylinder body, 22—piston, 23—spring for spring braking, 24—pushrod, 25—clutch, 26—operation part, 27—microswitch, 37—ball, 38—control part, 61, 76, 77—convex, 72, 63, 67—concave.

We claim:

1. A spring brake cylinder assembly, said assembly comprising:

(a) a body portion having a pair of axially-opposed end walls;

(b) a piston positioned for reciprocal axial movement within said body portion, said piston having a face portion adjacent a first end wall of said body portion and a stem portion extending in an axial direction from an inner surface of said face portion of said piston;

(c) a piston guide means engageable with said stem portion of said piston and a second end wall of said body portion for guiding said piston in an axial direction during reciprocal axial movement of said piston;

(d) a brake spring caged between said inner surface of said face portion of said piston and said second end wall of said body portion to supply a predetermined braking force to said assembly;

(e) a pushrod extending coaxially out of said second end wall of said body portion and movable in an axial direction in response to said reciprocal axial movement of said piston;

(f) a clutch means positioned for engagement with each of said stem portion of said piston and said pushrod and said piston guide means for making a connection and disconnection of said pushrod with said piston, thereby controlling their relative displacements in an axial direction;

(g) a clutch control means engageable with said clutch means and said piston guide means for controlling said clutch means between an engaged and disengaged state, said clutch control means including an elongated hollow portion surrounding said pushrod and extending out of said second end of said body portion;

(h) a clutch operating means positioned to engage said clutch control means for manually releasing said assembly from a brake application; and (i) a sensing means positioned adjacent to and in engagement with said hollow portion of said clutch control means adjacent said second end of said body portion for indicating an operating condition of said assembly.

2. A spring brake cylinder assembly, according to claim 1, wherein said sensing means is a microswitch.

3. A spring brake cylinder assembly, according to claim 2, wherein said operating condition of said assembly includes a brake applied and a brake release position and said clutch control means includes means engageable with said sensing means for changing the position of the sensing element to identify said current operating condition.

4. A spring brake cylinder assembly, according to claim 1, wherein said pushrod is pivotally-connected adjacent said stem portion of said piston.

5. A spring brake cylinder assembly, according to claim 4, wherein said assembly includes a second piston disposed in said stem portion of said piston.

* * * * *